United States Patent [19]
Koga et al.

[11] Patent Number: 5,815,528
[45] Date of Patent: Sep. 29, 1998

[54] INTERACTIVE COMMUNICATION CIRCUIT FOR SELECTING A TRANSMITTING CIRCUIT TO GENERATE SIGNALS

[75] Inventors: Susumu Koga, Saga-ken; Hidetoshi Takano, Toyota; Noriyuki Takao, Toyota; Kiyoshi Mizuno, Toyota; Goro Kobayashi, Okazaki, all of Japan

[73] Assignees: Toyota Jidosha Kabushiki Kaisha, Toyota; Daiden Co. Ltd., Kurume, both of Japan

[21] Appl. No.: 505,959

[22] Filed: Jul. 24, 1995

[30] Foreign Application Priority Data

Aug. 26, 1994 [JP] Japan ..................................... 6-202398

[51] Int. Cl.⁶ ............................ H04B 3/02; G06F 13/362
[52] U.S. Cl. ........................ 375/220; 375/257; 375/259; 340/825.5
[58] Field of Search ..................................... 375/220, 377, 375/257, 211, 212, 213; 371/48, 57.1, 57.2, 67.1, 68.2; 370/229, 230, 235, 237, 360, 438, 439, 445, 462, 447, 461; 340/825.5, 825.51, 825; 395/726, 288, 287, 289, 293, 296

[56] References Cited

U.S. PATENT DOCUMENTS

| | | |
|---|---|---|
| 4,070,545 | 1/1978 | Diefenderfer ............................ 178/73 |
| 4,943,979 | 7/1990 | Webber, Jr. ................................. 375/4 |
| 5,398,261 | 3/1995 | Marbot ..................................... 375/257 |
| 5,402,420 | 3/1995 | Kobayashi ............................... 370/212 |
| 5,428,640 | 6/1995 | Townley .................................. 375/257 |
| 5,648,984 | 7/1997 | Kroninger et al. ..................... 375/211 |

FOREIGN PATENT DOCUMENTS

| | | |
|---|---|---|
| 55-96740 | 7/1980 | Japan . |
| 1-43982 | 2/1989 | Japan . |
| 5-136770 | 6/1993 | Japan . |

*Primary Examiner*—Chi H. Pham
*Assistant Examiner*—William Luther
*Attorney, Agent, or Firm*—Oblon, Spivak, McClelland, Maier & Neustadt, P.C.

[57] ABSTRACT

Preventing signals from undesirably entering and enabling interactive communication. Signals from a main line or branch line are received by receiving circuits. Signal detecting circuits detect signals, and then transmit the detected signals (detection B and detection A) to a first-arrival judging circuit. The first-arrival judging circuit determines which signal is the first arrival between the signals from the detecting circuits, and then allows one of transmitting circuits to output a signal. Accordingly, only one of the transmitting circuits generates signals, preventing signals of the other transmitting circuit from entering and enabling interactive communication.

5 Claims, 9 Drawing Sheets

AT TERMINAL CIRCUIT OF MAIN LINE (INPUT SIGNAL)

AT RECEIVING CIRCUIT OF MAIN LINE

AT TRANSMITTING CIRCUIT (HIGH IMPEDANCE WHEN TRANSMISSION IS INVALID)

AT FILTERING CIRCUIT (TRANSMIT SIGNAL)

VALID TRANSMIT SIGNAL FROM MAIN LINE (ENABLE 2)
<"LOW" IS VALID>

OUTPUT OF DIFFERENCE DETECTOR

INPUT FROM MAIN LINE

OUTPUT OF NON-LINEAR AMPLIFIER

OUTPUT TO BRANCH LINE

TRANSMISSION FROM BRANCH LINE TO MAIN LINE

INTERACTIVE COMMUNICATION CIRCUIT FOR SELECTING A TRANSMITTING CIRCUIT TO GENERATE SIGNALS

BACKGROUND OF THE INVENTION

1. Field of the Invention

The present invention relates to an interactive communication circuit for extended telecommunication lines that interactively transmit signals.

2. Description of the Prior Art

With the progress of electronic communication technology in recent years, computer data control systems have been increasingly employed in various areas such as control systems in factories and data processing in offices. In such systems, a plurality of terminals are connected by way of telecommunication lines to send or receive necessary signal among these terminals. For instance, a multidrop line (distributed multidrop line) in a digital communication system, in which a plurality of communication devices are multipoint-connected in parallel to a single physical communication medium (such as a communication cable), is provided with a terminal resistor at both ends of the main line. A transmitter and a receiver are connected to branch lines that are extended from the main line.

For instance, as shown in FIG. 10, RS-485, a form of multidrop line, is provided with a terminal resistor R at each end of the main line 1 that consists of a pair of communication lines. A plurality of communication devices 2 are connected to the main line 1 by way of branch lines 3.

In 10Base5 of Ethernet, which is another form of communication line, a plurality of communication stations 5 are connected to a main line 4 that is formed of a coaxial cable as shown in FIG. 11. However, devices 6 named MAUs transform signals that are sent from the main line and branch lines. Thus, the branch lines 7 between the communication stations 5 and MAUs 6 constitute transmission lines of a type different from the main line 4.

Since the transmission lines for sending and receiving are identical in these multidrop line communication systems, it is necessary to employ protocols for deciding when to transmit according to software. This communication is made in half duplex mode and will be hereinafter referred to as interactive identical-transmission-line communication.

In a communication system with the main line and branch lines connected together as in RS-485, the branch lines 3 connected to the receiver have a high impedance. Therefore, it is necessary to make the branch lines 3 as short as possible. However, if the branch lines 3 are short or no branch lines 3 are connected, the main line 1 has a disadvantage of being limited when it is routed. Namely, when the branch lines 3 are short, the main line 1 has to be routed to the place where the communication devices 2 are placed, causing difficulties in installation. Besides, if the communication devices 2 are moved, the main line 1 has to be moved too.

In a communication system using MAUs of 10Base5 with the main line 4 and the branch lines 7 separated, the length of the branch lines 7 does not have much influence on the system. However, the branch lines 7 need to have independent transmission lines for sending and receiving, leading to a high production cost of the branch lines 7. Further, the circuit structure on the side of the communication stations 5 is not of interactive identical-transmission-line communication, and therefore the communication stations 5 that are designed for interactive identical-transmission-line communication cannot be used.

Japanese Patent Laid-Open Publication No. Hei 5-136770 discloses a communication circuit which comprises two transmission lines to separate signals in two directions and transmit the amplified signals thereafter. Thus, the communication circuit shows an improved reliability of transmission lines in interactive identical-transmission-line communication. In such communication circuits, amplified signals can be transmitted and impedance matching can be readily performed. Thus, communication devices can be connected without difficulty.

However, the communication system disclosed in the above publication functions on condition that signals are perfectly separated. If separation is not perfectly performed, signals are transmitted from one transmission line to the other, resulting in unreliable signal transmission.

SUMMARY OF THE INVENTION

It is the principal object of the present invention to provide an interactive communication circuit which can extend transmission lines while reliably transmitting signals.

In an interactive communication circuit of the present invention, a first-arrival judging means judges which signal is the first arrival in two transmission lines. In accordance with the result of the first-arrival judging means, one signal is determined to be valid and the other one is determined to be invalid using a switching means. Thus, one of the two transmission lines is selected as the route for transmitting signals while the other transmission line is disconnected, thereby preventing signals from undesirably entering and ensuring interactive communication.

In another embodiment of an interactive communication circuit according to the present invention, each transmission line is provided with a difference detecting circuit for detecting the difference between an output signal from the other transmission line and the summation signal of an input signal sent to the selected transmission line and an output signal from the other transmission line. When signals being transmitted are sent to both transmission lines, the output of the other transmission line is canceled at the difference detecting circuit, whereby the output signals of the selected transmission line is not adversely affected. Thus, reliable interactive signal transmission can be achieved.

DETAILED DESCRIPTION OF THE PREFERRED EMBODIMENTS

Hereinafter, the preferred embodiments of the present invention will be described referring to the attached drawings.

Example 1

Figure 1:
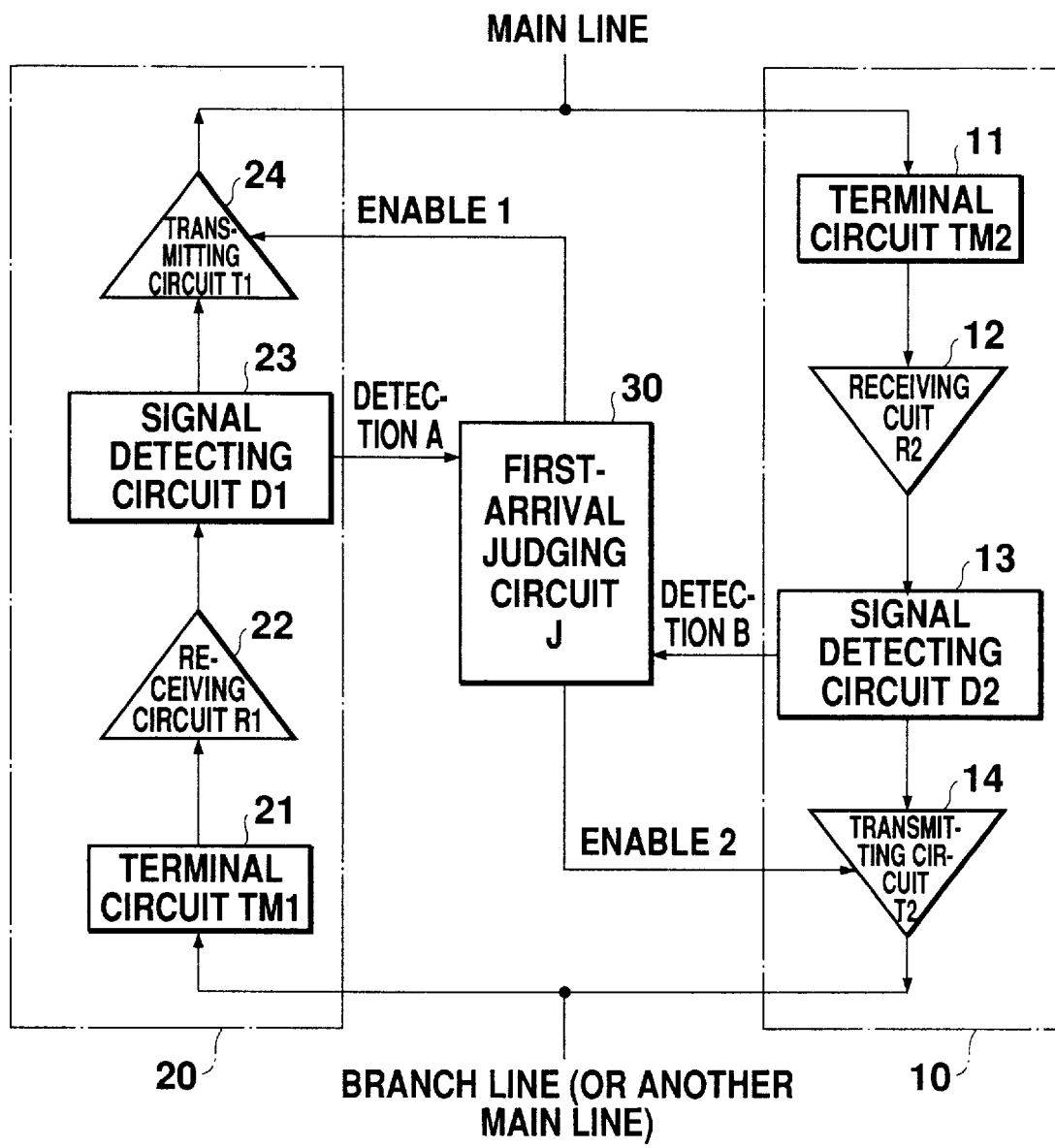
FIG. 1 is a block diagram of the overall structure of Example 1.

FIG. 1 is a block diagram of the entire structure of a communication circuit for interactive identical-transmission-line transmission in accordance with Example 1. As can be seen from this drawing, this circuit consists of a first transmission line 10, a second transmission line 20 and a first-arrival judging circuit 30. The first transmission line 10 consists of a terminal circuit 11, a receiving circuit 12, a signal detecting circuit 13 and a transmitting circuit 14. The second transmission line 20 consists of a terminal circuit 21, a receiving circuit 22, a signal detecting circuit 23 and a transmitting circuit 24. The terminal circuit 11 of the first transmission line is connected to the transmitting circuit 24 of the second transmission line by way of a main line, while the transmitting circuit 14 of the first transmission line 10 is connected to the terminal circuit 21 of the second transmission line 20 by way of a branch line (or another main line).

The terminal circuit 11 can control connection and disconnection of the terminal resistor. When the circuit of this example is connected to the terminal resistor portion of the main line, the terminal circuit 11 connects the terminal resistor. On the other hand, when a branch line is extended from the main line, the terminal resistor remains disconnected. As for the terminal circuit 21, a branch line connected to this amplifier should be terminated. Accordingly, the terminal circuit 21 connects the terminal resistor at all times and then performs impedance matching with the cable. The receiving circuits 12 and 22 receive signals supplied from the terminal circuits 11 and 21, respectively, and amplify the received signals to transform them to digital signals of certain levels. The signal detecting circuits 13 and 23 judge, from the variation state of the output (or input) of the receiving circuits 12 and 22, whether a signal exists or not. When there is a signal (in other words, when the digital level varies over a certain range or wider), the signal detecting circuits 13 and 23 decide that the detected output is of a valid level (High); when there are no signals, the detected output is of an invalid level (Low). Then, the signal detecting circuits 13 and 23 transmit the detected signals (detection B and detection A, respectively) to the first-arrival judging circuit 30.

Meanwhile, the received signals at the receiving circuits 12 and 22 pass through the signal detecting circuits 13 and 23 and then reach the transmitting circuits 14 and 24. When enabling signals (Enable 2 and Enable 1) are of a valid level, the transmitting circuits 14 and 24 transform the input digital level signals so that they have a predetermined waveform, and then release them. On the other hand, when the enabling signals are of an invalid level, the output is of high impedance. Thus, with an enabling signal transmitted to either of the transmitting circuits 14 and 24, a signal is transmitted from only one of the transmitting circuits 14 and 24, and the other transmitting circuit is in a high impedance state. Accordingly, signals are prevented from entering from one transmission line to the other, allowing the transmission of signals in only one direction.

Enabling signals (Enable 2 and Enable 1) sent to the transmitting circuits 14 and 24 are transmitted from the first-arrival judging circuit 30. According to the detected signals being transmitted from the signal detecting circuits 13 and 23, the first-arrival judging circuit 30 determines the enabling signals to be valid (enabling) or invalid (disabling). With a detected signal from the signal detecting circuit 23 as detection A and a detected signal from the signal detecting circuit 13 as detection B, when the detection A changes from an invalid level (L) to a valid level (H) faster than the detection B, the first-arrival judging circuit 30 allows the output of the transmitting circuit 24 by determining the enabling signal (Enable 1) being transmitted to the transmitting circuit 24 to be valid (H). Meanwhile, the transmitting circuit 14 is in a disabling state (Enable 2 is L) and in a high impedance state.

As described above, the first-arrival judging circuit 30 allows the output from one of the transmitting circuits 14 and 24 in the transmission lines 10 and 20 from which signals have been detected previously, judging from the state which the detection A and detection B transmitted from the signal detecting circuits 13 and 23 are in. When it is judged that the detections A and B reach a valid level simultaneously, one of the enabling signals is set as (H), determining one of the transmission lines 10 and 20 to be valid in accordance with the predetermined priority. Both enabling signals can remain invalid, in which case the next judgment is to be made only after both detections A and B are determined to be invalid.

Figure 2:
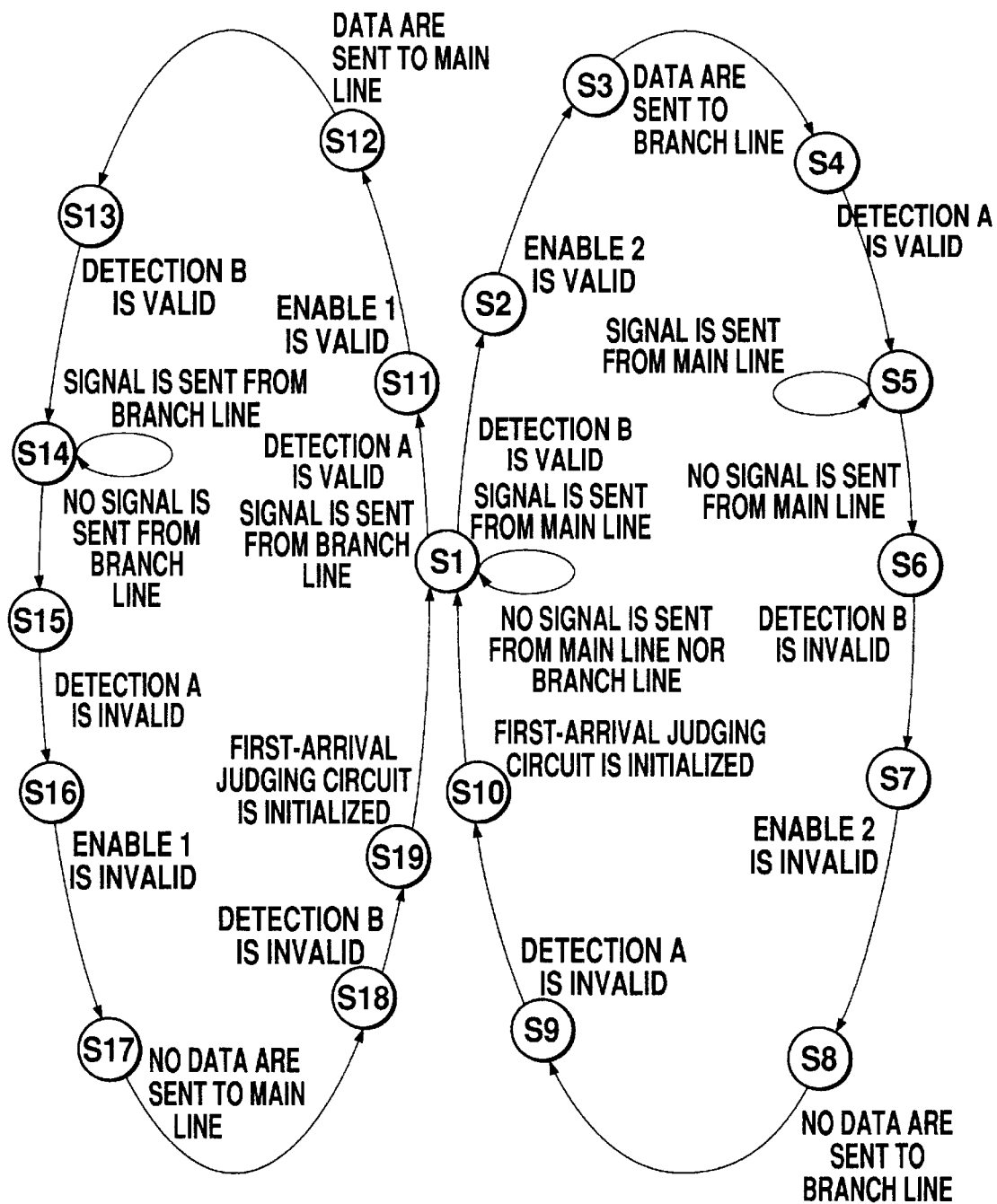
FIG. 2 is an explanatory diagram of the state transition in Example 1.

The internal operation of an amplifying circuit in this example will be hereinafter described referring to the state transition diagram in FIG. 2. State S1 is where no data exists on the main line side nor on the branch line side. When signals are transmitted from the main line, the signal detecting circuit 13 detects them and determines detection B to be valid. The first-arrival judging circuit 30 then determines the transmitting circuit 14 to be valid as well as Enable 2, whereby the operation proceeds to S2. Since the transmitting circuit 14 is allowed to transmit signals in S2, data are sent from the transmitting circuit 14 to the branch line side in S3. The data transmitted from the transmitting circuit 14 in S3 are also received at the receiving circuit 22. Thus, the operation proceeds to S4, where the signal detecting circuit 23 determines the detection A to be valid. At the first-arrival judging circuit 30, the detection B has first become valid and therefore an enabling signal Enable 1 being sent to the transmitting circuit 24 remains at an invalid level (L). The operation S5 continues until the main line ceases to send signals.

When the main line ceases to send signals in S5, the operation proceeds to S6. With no signals transmitted from the main line, the signal detecting circuit 13 determines the detection B to be invalid (L), and the operation then proceeds to state S7. In S7, the first-arrival judging circuit 30 detects that the detection B has become invalid (L), and makes the enabling signal 2 being sent to the transmitting circuit 14 invalid (L) too, where the operation proceeds to state S8. In S8, the transmitting circuit 14 gives a high impedance to the signals being sent to the branch line, thereby preventing data transmission. For instance, the switch is turned off to disconnect the branch line. In S9, the receiving circuit 22 ceases to receive data from the transmitting circuit 14 and the detection A from the signal detecting circuit 23 becomes invalid (L), where the operation proceeds to state S10. In S10, the detection A and detection B are both invalid (L) at the first-arrival judging circuit 30, which is ready for the next first-arrival judging, where the operation returns to S1.

On the other hand, when data are transmitted from the branch line, the operation state moves from S1 to S11. S11 through S19 are performed in the same manner as described above. The operation then returns to state S1.

The interactive identical-transmission-line communication is made in half duplex mode, and therefore it is generally unlikely that the detection A and detection B both become valid. However, upon starting transmission operation, the detection A and detection B may both become valid. In this case, the first-arrival judging circuit 30 predetermines one of the enabling signals (Enable 1, Enable 2) to be valid or both enabling signals to be invalid, thus preventing signals from entering and oscillation of the circuit.

Figure 3:
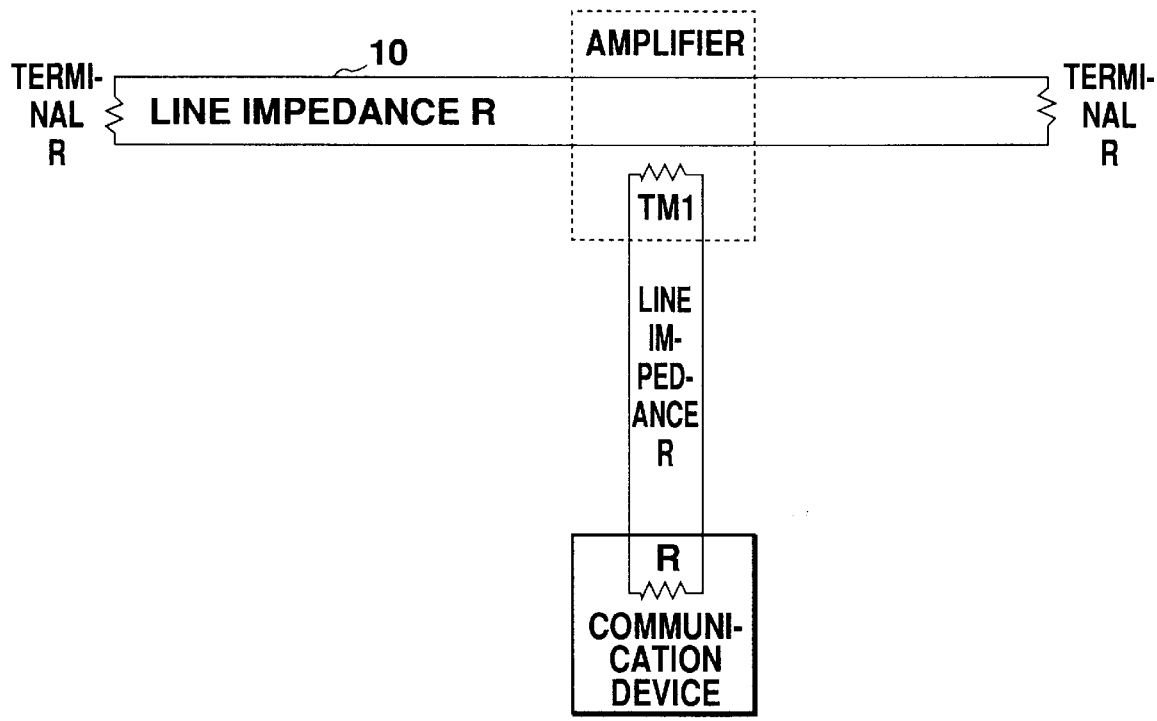
FIG. 3 is an explanatory diagram of the structure in the case where the branch line is extended.

Referring to FIG. 3, a structure of a branch line extended to a communication device will be described. In this case, the terminal circuit 11 shown in FIG. 1 is free from a terminal resistor. Therefore, the input impedance of the receiving circuit 12 of the main line becomes virtually maximum and an equivalent circuit as shown in FIG. 3 is formed by attaching the amplifying circuit of this example to the main line. The termination on the branch line to be connected to the communication circuit is performed at the terminal circuit 21, placing the branch line in the same condition as the main line. Since the amplifying circuit of the present invention amplifies signals, there are no signals decaying and impedance matching is performed as usual upon termination processing. For instance, if the impedance of the main line is 75 ohms, the impedance of the branch line can be 75 ohms on the transmission side, input side and cable side. By making the electrical characteristics of the branch line akin to those of the main line, the branch line can be desirably extended up to the same length as that of the main line, and a further branch line can be extended from the branch line. Accordingly, the topology of the network can be flexibly changed.

Figure 4:
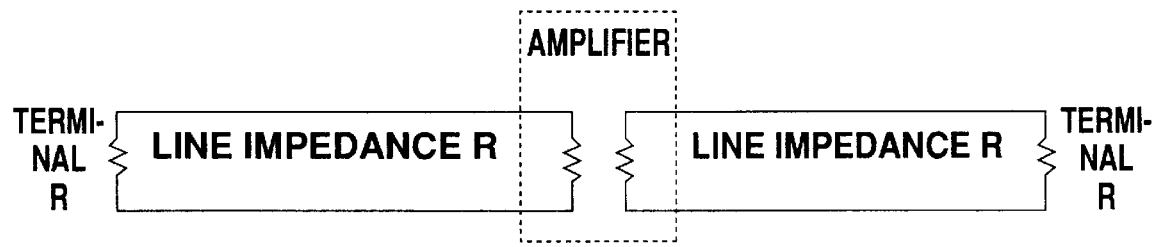
FIG. 4 is an explanatory diagram of the structure in the case where the main line is extended.

When the main line is extended, as shown in FIG. 4, the terminal circuit 11 of the main line is provided with a terminal resistor, whereby the circuit becomes an equivalent circuit shown in FIG. 4 and two independent main lines can be connected by the amplifying circuit of this example. The length of the main line can be adjusted as necessary by connecting an additional main line.

Figure 5:
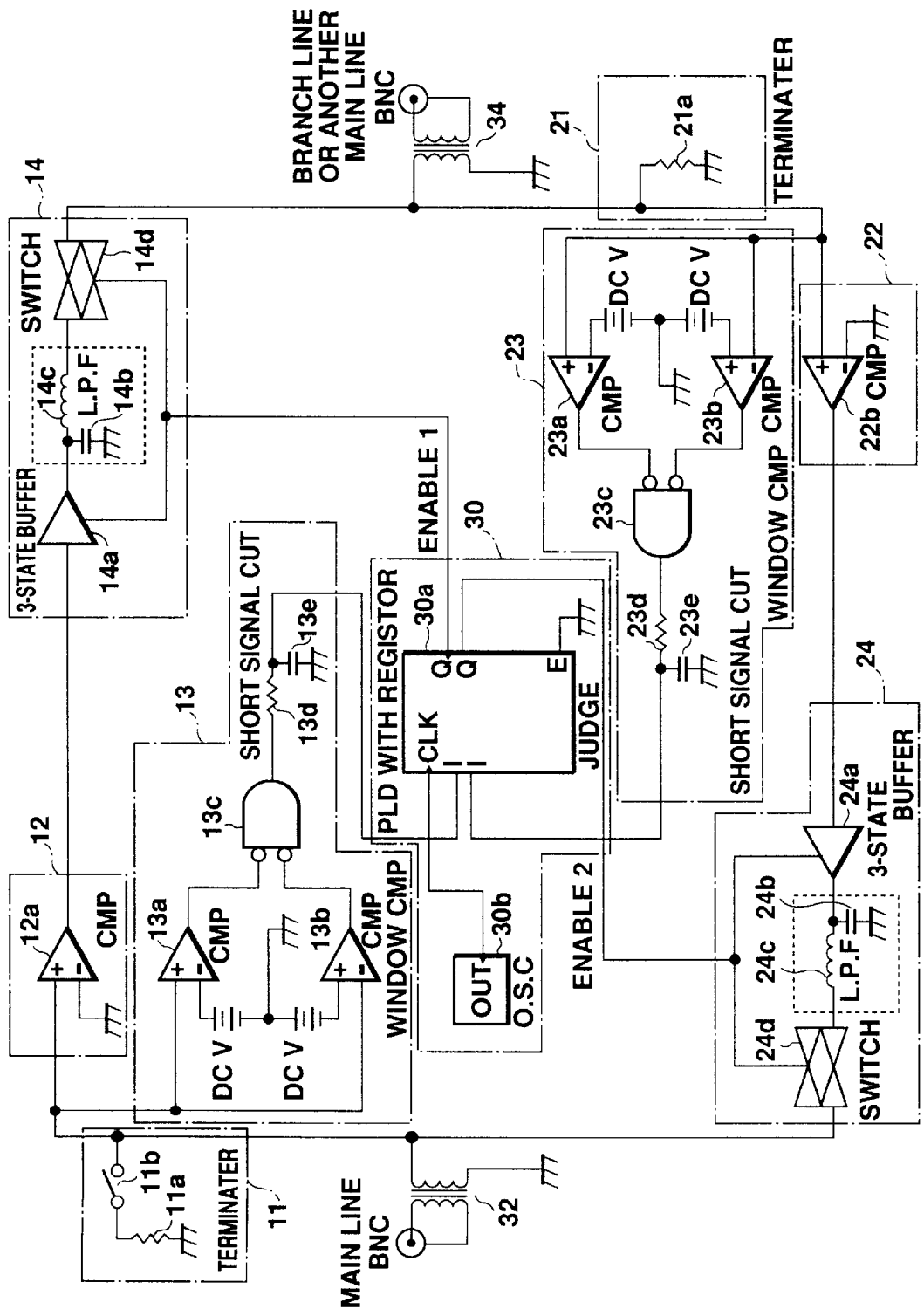
FIG. 5 is a circuit diagram showing a detailed structure of Example 1.

FIG. 5 illustrates the circuit of this example in detail. The structure of the first transmission line 10 is identical to that of the second transmission line 20, except for the terminal circuits 11 and 21, and their functions are substantially the same. Therefore, description will be given for only one transmission line.

Figure 6:
FIGS. 6(A)–6(E) are waveform charts of each part of Example 1.
Figure 6:
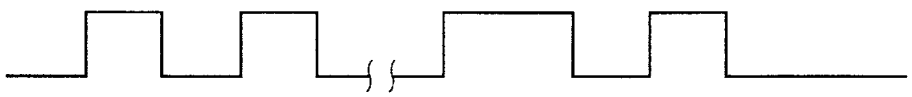
Figure 6:
Figure 6:
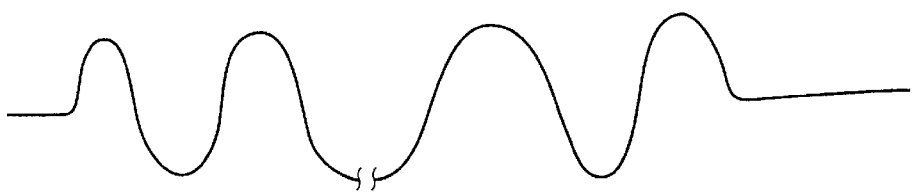
Figure 6:

The terminal circuit 11 comprises a terminal resistor 11a and a switch 11b. The switch 11b is turned off as necessary, thereby performing termination. The receiving circuit 12 comprises a comparator 12a. The receiving circuit 12 amplifies input signals to high levels, and transforms them to digital signals of H or L. Namely, a signal having a waveform as shown in FIG. 6(A) sent to the receiving circuit 12 will be transformed to a digital signal as shown in FIG. 6(B), which is the output of the receiving circuit 12.

The signal detecting circuit 13 comprises comparators 13a and 13b, a NOR gate 13c, a resistor 13d, and a capacitor 13e. The output of the terminal circuit 11 is sent to the non-inversion input terminal of the comparator 13a and the inversion input terminal of the comparator 13b. A fixed DC voltage V is applied to the inverting input terminal of the comparator 13a while a fixed DC voltage −V is applied to the non-inverting input terminal of the comparator 13b. Accordingly, when an input signal being sent to the signal detecting circuit 13 has a DC voltage of higher than V or lower than −V, the output of the comparator 13a and the output of the comparator 13b are at L level, which means that the signals being sent to the NOR gate 13c are both at L-level, thus transmitting a H-level output.

The output of the NOR gate 13c is integrated at an integrating circuit made up of the resistor 13d and the capacitor 13e, thus removing H-level signals of short duration. The output of the signal detecting circuit 13 is at H-level only when a large state of changes continues while receiving signals. The H-level output therein is transmitted as a detection B to the first-arrival judging circuit 30.

The output of the receiving circuit 12 is sent to the transmitting circuit 14, which comprises a 3-state buffer 14a, a capacitor 14b, a coil 14c, and a switch 14d. The capacitor 14b and the coil 14c constitute a low-pass filter that smooths the output of the 3-state buffer 14a. Transmit signals having a waveform as shown in FIG. 6(D) can be obtained by sending the output of the 3-state buffer 14a as shown in FIG. 6(C) through the low-pass filter. The operations of the 3-state buffer 14a and the switch 14d are controlled by the enabling signal (Enable 1) from the first-arrival judging circuit 30. In this example, an L-level enabling signal 1 turns on the 3-state buffer 14a and the switch 14d, and the transmitting circuit 14 then releases the processed signal. On the other hand, an H-level enabling signal 1 is not subjected to the amplifying process at the 3-state buffer 14a, and the switch 14d frees the internal circuit of the output signal conductor. Thus, with the transmitting circuit 14 turned off, the output signal conductor is put in a high impedance state.

Lastly, the first-arrival judging circuit 30, which comprises a logical circuit 30a and an oscillation circuit 30b, judges which signal is the first arrival in accordance with the input signals, detection A and detection B, and transmits the enabling signal (Enable 1 or 2) that has first turned to the valid level (H-level). The first-arrival judging is performed slightly after the signal is inputted. Therefore, as shown in FIG. 6(E), the enabling signal becomes valid (H-level) slightly after the signal input has actually started. Since a signal is generally provided with a preamble signal that is substantially meaningless, there will not be any problems even if the first part of the data is missing.

As shown in FIG. 5, the amplifying circuit and the main and branch lines are connected by way of transformers 32 and 34. Since the amplifying circuit is not directly connected to the main line or branch line, the impedance of each circuit can be set desirably in the terminal circuits, effectively preventing signals from reversing at the connections.

Example 2

Figure 7:
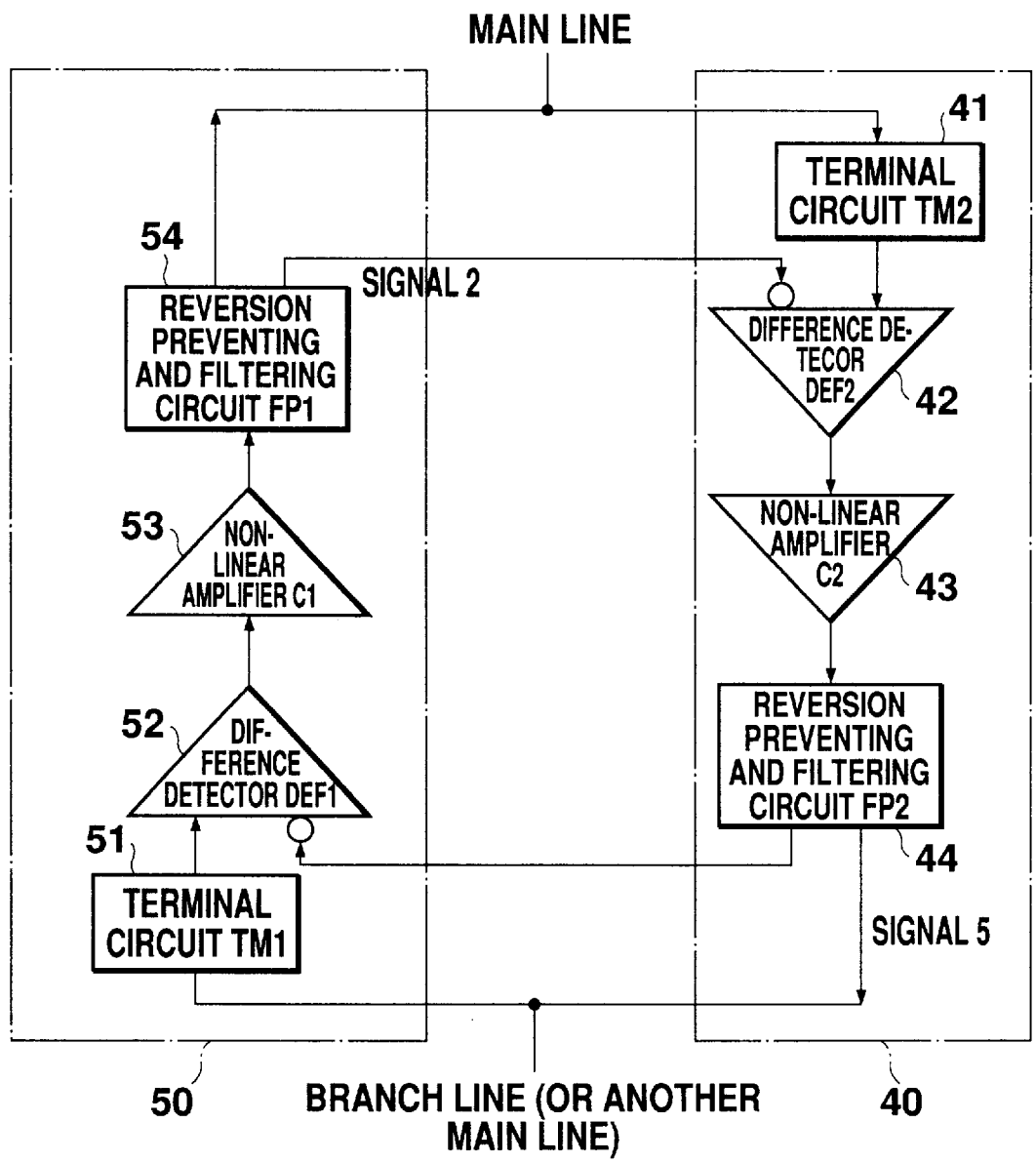
FIG. 7 is a block diagram of the overall structure of Example 2.

Example 2 will be hereinafter described referring to FIG. 7. The circuit in this example consists of a first transmission line 40 and a second transmission line 50. The first transmission line 40 consists of a terminal circuit 41, a difference detector 42, a non-linear amplifier 43, and a reversion preventing and filtering circuit 44, while the second transmission line 50 consists of a terminal circuit 51, a difference detector 52, a non-linear amplifier 53, and a reversion preventing and filtering circuit 54. Signals transmitted from the reversion preventing and filtering circuit 44 are sent to the difference detector 52 while signals transmitted from the reversion preventing and filtering circuit 54 are sent to the difference detector 42.

Signals transmitted from the main line or branch line are sent to the terminal circuits 41 and 51, wherein the termination is performed as in Example 1 described above.

Output signals from the terminal circuits 41 and 51 are sent to first input terminals of the difference detectors 42 and 52. Signals processed by the difference detectors 42 and 52 are sent to the non-linear amplifiers 43 and 53, wherein the input signals are amplified to the fixed level digital signals as in the receiving circuits 12 and 22 described above.

Figure 8:
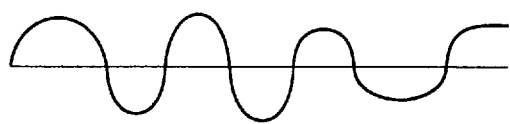
FIGS. 8(A)–8(E) are waveform charts of each part of Example 2.
Figure 8:
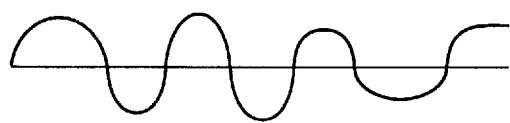
Figure 8:
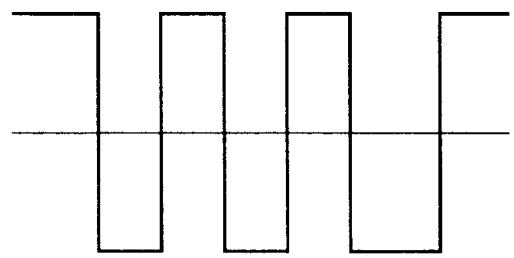
Figure 8:
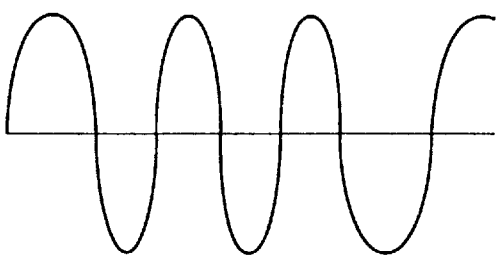
Figure 8:
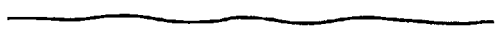

When the terminal circuits 41 and 51 transmit output signals (that is, input signals from the main line) as shown in FIG. 8(A), the difference detectors 42 and 52 transmit signals as shown in FIG. 8(B). The non-linear amplifiers 43 and 53 then transmit digital signals as shown in FIG. 8(C). Further, the reversion preventing and filtering circuits 44 and 54 smooth the waveform of the signals transmitted from the non-linear amplifiers 43 and 53, and then transmit signals as shown in FIG. 8(D).

The above output signals are sent to first input terminals of the difference detectors 52 and 42. The output signals of the reversion preventing and filtering circuits 44 and 54 are sent to inversion input terminals of the difference detectors 52 and 42, respectively. Accordingly, when no input signals are transmitted from the main line or branch line, the signals of the two input terminals of the difference detectors 52 and 42 become exactly opposite to each other, wherein the difference is detected and the output signals are virtually zero. Thus, the output signals from either the first or second transmission line that has no input signals become zero, whereby signals can be transmitted from the main line to the branch line. In this example, the reversion preventing and filtering circuits 44 and 54 are designed to generate a high impedance if a signal has no waveform, thereby making only one transmission line valid.

Figure 9:
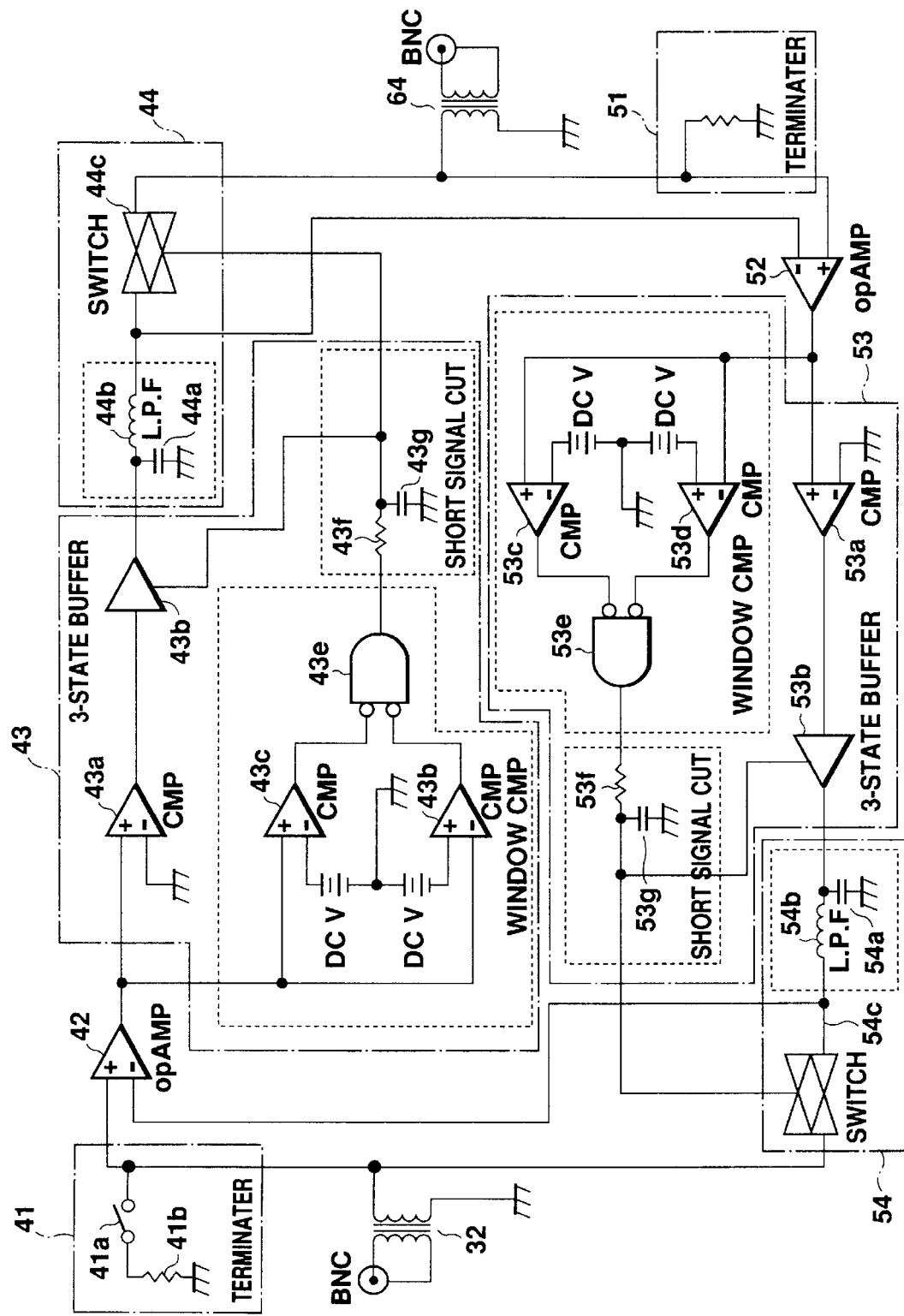
FIG. 9 is a circuit diagram showing a detailed structure of Example 1.
Figure 10:
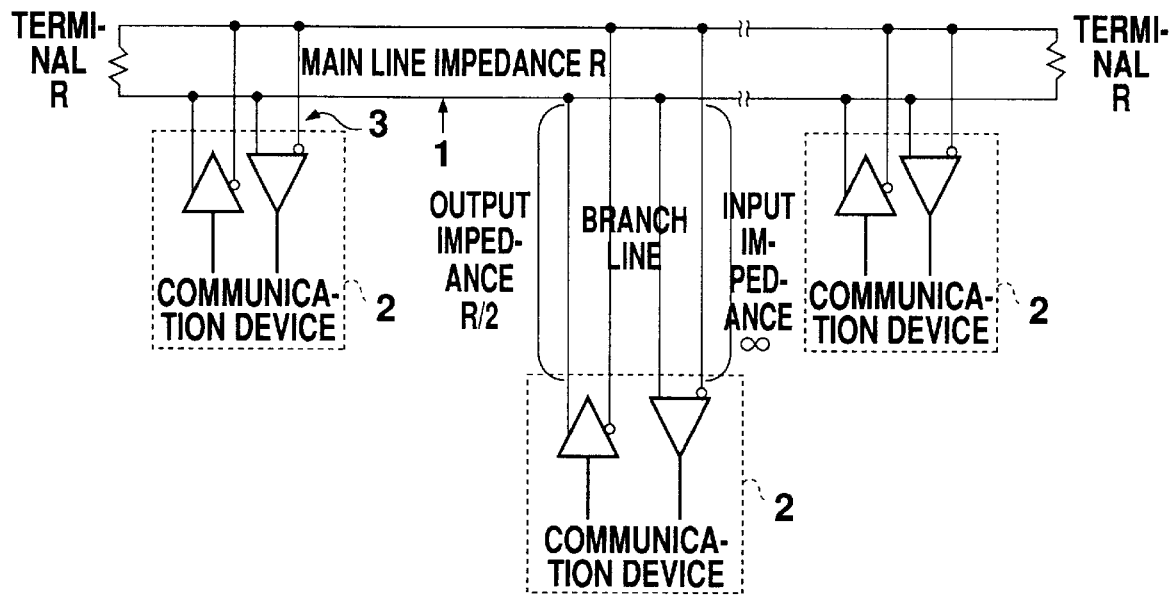
FIG. 10 is a diagram showing a structural example of the prior art.
Figure 11:
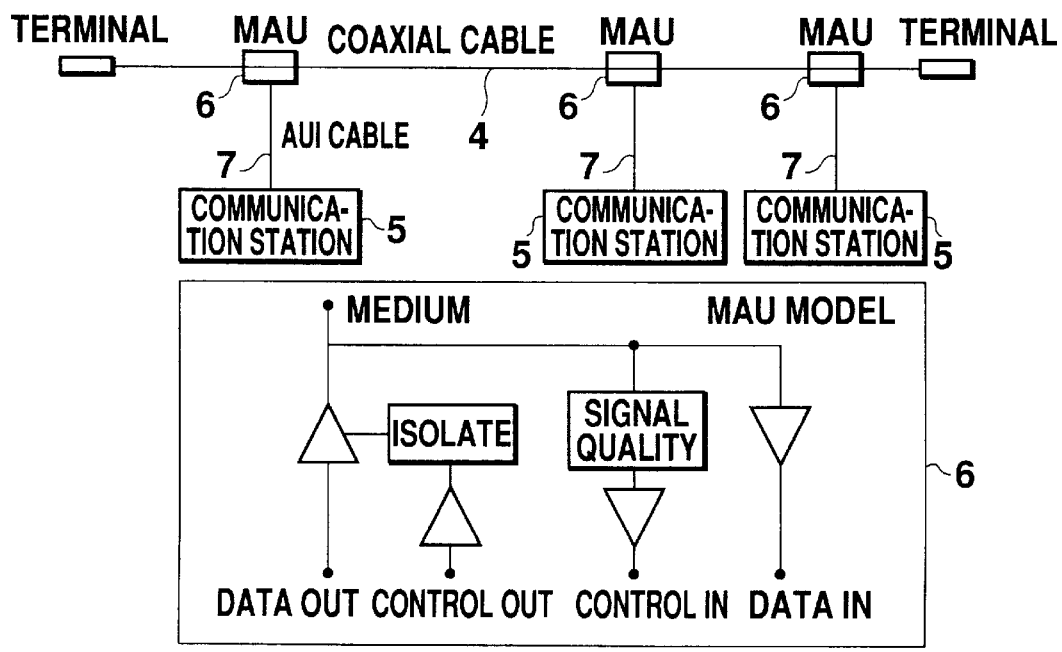
FIG. 11 is a diagram showing another structural example of the prior art.

FIG. 9 illustrates the circuit of this example in detail. Since the structure and function of the first transmission line are substantially identical to those of the second transmission line, explanation will be given hereinafter of only one transmission line.

The terminal circuit 41 consists of a terminal resistor 41a and a switch 41b. The switch 41b is closed as necessary, thereby performing termination. Terminated signals transmitted from the main line are sent to the non-inverting input terminal of the difference detector 42.

The structure of the reversion preventing and filtering circuit 54 will be hereinafter described with reference to the input of the difference detector 42. The reversion preventing and filtering circuit 54 consists of a switch 54c and a low-pass filter consisting of a capacitor 54a and a coil 54b. The switch 54c is turned on when a signal is detected in the output of the difference detector 52, and it is turned off when no signals are detected. The output side of the switch 54c is connected to the main line while its input side is connected to the inverting input terminal of the difference detector 42.

The difference detector 42 detects the difference between a signal of the input side of the switch 54c and a summation signal of a signal from the main line and the output of the switch 54c. When no signals are transmitted, the 3-state buffer 53b of the non-linear amplifier 53 and the switch 54c are both turned off. If a signal is transmitted from the main line under such conditions, the difference detector 42 transmits a signal in accordance with the difference between the two signals. That is, a signal shown in FIG. 8(B) is obtained from a signal shown in FIG. 8(A).

The non-linear amplifier 43 includes a comparator 43a, which amplifies input signals to a high level in accordance with the level of each input signal, and then transmits digital signals of H and L levels as shown in FIG. 8(C). Such digital signals are transmitted by way of the 3-state buffer 43b.

The non-linear amplifier 43 also functions as a signal detector, comprising comparators 43c and 43d, a NOR gate 43e, a resistor 43f, and a capacitor 43g. The output of the difference detector 42 is sent to the non-inversting input terminal of the comparator 43c and the inverting input terminal of the comparator 43d. A fixed DC voltage V is applied to the inversting input terminal of the comparator 43c while a fixed DC voltage −V is applied to the non-inverting input terminal of the comparator 43d. Accordingly, when an output signal of the difference detector 42 has a DC voltage of higher than V, or lower than −V, the output of the comparator 43c and the output of the comparator 43d are on L level, whereby the NOR gate 43e transmits H-level signals. The output of the NOR gate 43e is integrated at an integrating circuit made up of the resistance 43f and the capacitor 43g, removing H-level signals of short duration. The integrated signals are then sent to the 3-state buffer 43b as control signals. When the integrated signals are at H level, the 3-state buffer 43b transmits the output of the comparator 43a directly.

The output of the 3-state buffer 43b, which is the output of the non-linear amplifier 43, is sent to the reversion preventing and filtering circuit 44. The reversion preventing and filtering circuit 44 consists of a capacitor 44a, a coil 44b and a switch 44c, as does the reversion preventing and filtering circuit 54. The capacitor 44a and the coil 44b constitute a low-pass filter, which smooths the output of the 3-state buffer 43b. Signals having a waveform as shown in FIG. 8(D) can be obtained by smoothing the output of the 3-state buffer 43b as shown in FIG. 8(C). The output of the integrating circuit in the non-linear amplifier 43 has a control over the switch 44c like the 3-state buffer 43b. Accordingly, when a signal is detected in the output of the difference detector 42, the 3-state buffer 43b and the switch 44c are turned on, thereby transmitting a signal of FIG. 8(D) to the branch line. Furthermore, no signal is output from the reversion preventing and filtering circuit 54 to the main line as shown in FIG. 8(E).

The output of the reversion preventing and filtering circuit 44 is connected not only to the branch line but also to the non-inverting input terminal of the difference detector 52 by way of the terminal circuit 51. The input side of the switch 44c of the reversion preventing and filtering circuit 44 is connected to the inverting input terminal of the difference detector 52. Where the switch 54c is turned on upon receiving a signal from the main line as described above, the two input terminals of the difference detector 52 receive identical signals, the difference of which is zero. The switch 54c of the reversion preventing and filtering circuit 54 is then turned off and its output side stays in a high impedance state. The 3-state buffer 53b is also turned off, and the difference detector 42 therefore transmits only input signals from the main line.

When a signal is transmitted from the branch line under the above conditions, the non-inverting input terminal of the difference detector 52 receives the summation signal of an output signal from the reversion preventing and filtering circuit 44 and an input signal from the branch line. The inverting input terminal of the difference detector 52 receives signals from the input side of the switch 44c. Thus, signals from the input and output sides of the switch 44c sent to the two input terminals of the difference detector 52 are canceled, and therefore, the difference detector 52 transmits only the signals from the branch line. The output of the difference detector 52 is transformed to the output of the NOR gate 53e which functions as a signal detector of the non-linear amplifier 53. The output of the NOR gate 53e is at H level, whereby the 3-state buffer 53b and the switch 54c are turned on. Then, the signals from the branch line are amplified and transmitted to the main line.

The signals from the input and output sides of the switch 54c in the reversion preventing and filtering circuit 54 are transmitted to both input terminals of the difference detector 42. However, since both signals are identical, the difference detector 42 cancels them out, leaving no problems.

Thus, according to this example, signals being transmitted in transmission routes are not adversely affected, because the difference detectors 42 and 52 detect differences of signals from other transmission lines and cancel them therein. Undesirable entering of signals is thus prevented and thereby a preferred embodiment of an interactive communication circuit can be achieved.

In addition, as shown in FIG. 9, the entire amplifying circuit is connected to the main line and branch line by means of transformers 62 and 64 in the same way as above.

What is claimed is:

1. An interactive communication circuit for interactively communicating by connecting a first communication circuit and a second communication circuit, said interactive communication circuit comprising:

a first transmission line for transmitting first signals from said first communication circuit to said second communication circuit, a second transmission line for transmitting second signals from said second communication circuit to said first communication circuit, and a first-arrival judging circuit for judging a first arrival signal from first and second detection signals, said first transmission line comprising, a first signal detecting circuit for detecting first input signals to be transmitted in said first transmission line and for outputting said first detection signal in response to detecting the first input signals, and a first switch for deciding that said first transmission line is valid and the first signals should be transmitted or that said first transmission line is invalid and the first signals should not be transmitted, said second transmission line comprising, a second signal detecting circuit for detecting second input signals to be transmitted in said second transmission line and for outputting said second detection signal in response to detecting the second input signals, and a second switch for deciding that said second transmission line is valid and the second signals therein should be transmitted or that said second transmission line is invalid and the second signals therein should not be transmitted, said first-arrival judging circuit receives said first and second detection signals from said first and second signal detecting circuits and decides which of said first and second detection signals first arrived, and controls said first and second switches to make one of the transmission lines valid and the other one invalid, whereby one of said first and second transmission lines is selected and signals from the selected transmission line are transmitted, wherein said first signal detecting circuit detects existence of the first input signals by detecting a potential of said first transmission line being out of a predetermined range, and said second signal detecting circuit detects existence of the second input signals by detecting a potential of said second transmission line being out of the predetermined range, wherein each of said first and second signal detecting circuits comprises, an upper comparator for comparing an electric potential of the transmission line with a relatively high-level first threshold, a lower comparator for comparing an electric potential of the transmission line with a relatively low-level second threshold, a logical operation circuit for subjecting an output of said upper and lower comparators to a logical operation, thereby detecting the electric potential of the transmission line being out of a predetermined range, and an integrating circuit for smoothing the output of said logical operation circuit.

2. An interactive communication circuit comprising a first transmission line for transmitting first signals from a first communication circuit to a second communication circuit and a second transmission line for transmitting second signals from said second communication circuit to said first communication circuit, wherein, said first transmission line comprises a first difference detecting circuit for detecting a difference between an output signal in said second transmission line and a summation signal of an input signal in said first transmission line and an output signal in said second transmission line, and said second transmission line comprises a second difference detecting circuit for detecting a difference between an output signal in said first transmission line and a summation signal of an input signal in said second transmission line and an output signal in said first transmission line, whereby the first signals from said first communication circuit are transmitted to said second communication circuit through said first transmission line, and the second signals from said second communication circuit are transmitted to said first communication circuit through said second transmission line.

3. An interactive communication circuit according to claim 2, wherein each of said first and second transmission lines further comprises at an input a terminal circuit for connecting each transmission line to ground by way of a terminal resistor, and at least one of said terminal circuits is provided with a switch for connecting or disconnecting said terminal resistance to the ground.

4. An interactive communication circuit according to claim 2, wherein, said first transmission line comprises a first non-linear amplifying circuit for fully amplifying an output of said first difference detecting circuit, a first switch for controlling whether or not an output of said first non-linear amplifying circuit is generated, and a first signal detecting circuit for detecting signal existence in said first transmission line, said first switch is turned on when said first signal detecting circuit detects the signal existence in said first transmission line, said second transmission line comprises a second non-linear amplifying circuit for fully amplifying an output of said second difference detecting circuit, a second switch for controlling whether or not an output of said second non-linear amplifying circuit is generated, and a second signal detecting circuit for detecting signal existence in said second transmission line, and said second switch is turned on when said second signal detecting circuit detects the signal existence in said first transmission line.

5. An interactive communication method of interactively communicating by connecting a first communication circuit and a second communication circuit, comprising a first transmission line for transmitting first signals from said first communication circuit to said second communication circuit and a second transmission line for transmitting second signals from said second communication circuit to said first communication circuit, which method includes the steps of, detecting a difference between an output signal in said second transmission line and a summation signal of an input signal in said first transmission line and the output signal in said second transmission line, on an input of said first transmission line, and detecting a difference between the output signal in said first transmission line and a summation signal of an input signal in said second transmission line and the output signal in said first transmission line, on an input of said second transmission line, whereby the first signals from said first communication circuit are transmitted to said second communication circuit by way of said first transmission line, and the second signals from said second communication circuit are transmitted to said first communication circuit by way of said second transmission line.

\* \* \* \* \*